United States Patent
Boyd et al.

(10) Patent No.: US 7,512,679 B2
(45) Date of Patent: Mar. 31, 2009

(54) APPARATUS AND METHOD TO SELECT A CAPTAIN FROM A PLURALITY OF CONTROL NODES

(75) Inventors: Kenneth W. Boyd, Tucson, AZ (US);
Kenneth F. Day, III, Tucson, AZ (US);
Philip M. Doatmas, Tucson, AZ (US);
John J. Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/652,144

(22) Filed: Aug. 29, 2003

(65) Prior Publication Data
US 2005/0050197 A1    Mar. 3, 2005

(51) Int. Cl.
*G06F 15/173* (2006.01)
*G06F 15/16* (2006.01)

(52) U.S. Cl. ........................ 709/224; 709/217
(58) Field of Classification Search .................. 709/224, 709/201, 237, 240, 243, 242
See application file for complete search history.

(56) References Cited

U.S. PATENT DOCUMENTS

| | | | |
|---|---|---|---|
| 4,814,984 A | 3/1989 | Thompson | 364/200 |
| 4,954,945 A | 9/1990 | Inoue | 364/200 |
| 5,951,683 A | 9/1999 | Yuuki et al. | 713/1 |
| 6,047,309 A * | 4/2000 | Dan et al. | 709/201 |
| 6,112,239 A * | 8/2000 | Kenner et al. | 709/224 |
| 6,178,445 B1 | 1/2001 | Dawkins et al. | 709/209 |
| 6,446,121 B1 * | 9/2002 | Shah et al. | 709/224 |
| 6,505,249 B1 * | 1/2003 | Rehkopf | 709/224 |
| 6,606,643 B1 * | 8/2003 | Emens et al. | 709/203 |
| 6,748,437 B1 * | 6/2004 | Mankude et al. | 709/227 |
| 6,751,673 B2 * | 6/2004 | Shaw | 709/224 |

(Continued)

FOREIGN PATENT DOCUMENTS

JP    9093244    4/1997

(Continued)

OTHER PUBLICATIONS

Rodriguez, Pablo et al. "Dynamic Parallel Access to Replicated Content in the Internet." IEEE/ACM Transactions on Networking. vol. 10, No. 4. Aug. 2002. 455-65. IEEE.*

(Continued)

*Primary Examiner*—Jason D Cardone
*Assistant Examiner*—Jeffrey R Swearingen
(74) *Attorney, Agent, or Firm*—Dale F. Regelman; Quarles & Brady LLP (57) ABSTRACT

A method to select a captain control node from a plurality of interconnected control nodes is disclosed. The method provides by each of the plurality of control nodes a first signal to each of the other control nodes, and then receives by each of the plurality of control nodes, a response signal from each of the other control nodes. The method then calculates by each of the plurality of control nodes individual response times for each of the other control nodes, and determines by each control node its aggregate response time. The method then determines whether to select a captain control node using the aggregate response times. If the captain control node is selected using the aggregate response times, then the method then determines the minimum aggregate response time, and designates the control node having that minimum aggregate response time the captain control node.

8 Claims, 7 Drawing Sheets

U.S. PATENT DOCUMENTS

2001/0023434 A1     9/2001    Viollet et al. ............... 709/208
2002/0055978 A1     5/2002    Joon-Bo et al. ............. 709/209
2002/0156878 A1*   10/2002   Conrad et al. ............... 709/223

OTHER PUBLICATIONS

Krishnamurthy, Balachander et al. "On the Use and Performance of Content Distribution Networks." Proceedings of the 1st ACM SIGCOMM Workshop on Internet Measurement. Nov. 2001. ACM. 169-82.*

Cranor, C.D. et al. "Design and Implementation of a Distributed Content Management System." Proceedings of the 13th international workshop on Network and Operating Systems Support for Digital Audio and Video. ACM. Jun. 2003. 4-11.*

* cited by examiner

APPARATUS AND METHOD TO SELECT A CAPTAIN FROM A PLURALITY OF CONTROL NODES

FIELD OF THE INVENTION

This invention relates to an apparatus and method to select on a performance basis a captain control node from among a plurality of interconnected control nodes. In certain embodiments, the invention relates to selecting a captain control node from a plurality of host computers. In certain embodiments, the invention relates to selecting a captain control node from a plurality of controllers disposed in a plurality of data storage and retrieval systems. In certain embodiments, the invention relates to selecting a captain control node from a plurality of controllers disposed in a plurality of primary backup appliances.

BACKGROUND OF THE INVENTION

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

In certain data processing applications, a plurality of interconnected computer systems, sometimes referred to as "host computers," provide information to a plurality of data storage and retrieval systems. It would be desirable to select a captain control node from among the host computers to coordinate the operations of those host computers.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track.

In certain data processing applications, a plurality of host computers provides information to a plurality of interconnected data storage and retrieval systems. It would be desirable to select on a performance basis a captain control node from among the plurality of data storage and retrieval systems to coordinate the operation of those systems.

Having a backup data copy is mandatory for many businesses for which data loss would be catastrophic. In addition, protection is required for recovering data if the entire system or even the site is destroyed by a disaster such as an earthquake, fire, explosion, hurricane, etc.

Disaster recovery requires that the secondary copy of data be stored at a location remote from the primary data. The secondary site must not only be sufficiently remote from the primary site, but must also be able to backup primary data in real time. The secondary site needs to backup primary data in real time as the primary data is updated, with some minimal delay. A difficult task required of the secondary site is that the secondary data must be "order consistent," that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

In certain data processing applications, a plurality of interconnected data storage and retrieval systems provides data to a plurality of interconnected primary backup appliances. The primary backup appliances form what are sometimes referred to as consistent transactions sets, and periodically provide those consistent transactions sets to a remote site for backup storage. It is desirable to select on a performance basis a captain control node from the plurality of primary backup appliances to coordinate the operation of those backup appliances.

SUMMARY OF THE INVENTION

Applicants' invention includes an apparatus and method to select a captain control node from a plurality of interconnected control nodes. The method provides by each of the plurality of control nodes a first signal to each of the other control nodes, and then receives by each of the plurality of control nodes, a response signal from each of the other control nodes. The method then calculates by each of the plurality of control nodes individual response times for each of the other control nodes, and determines by each control node its aggregate response time.

The method then determines whether to select a captain control node using the aggregate response times. If the captain control node is selected using the aggregate response times, then the method then determines the minimum aggregate response time, and designates the control node having that minimum aggregate response time the captain control node.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

The invention will be described as embodied in a data processing system which includes a plurality of host computers, a plurality of primary data storage and retrieval systems, a plurality of secondary data storage and retrieval systems, a plurality of backup appliances interconnecting the primary and secondary data storage and retrieval systems. The following description of Applicant's method to select a captain from a plurality of control nodes is not meant, however, to limit Applicant's invention to data processing applications, as the invention herein can be applied to monitoring and/or coordinating the operation of a plurality of computers in general.

Figure 4:
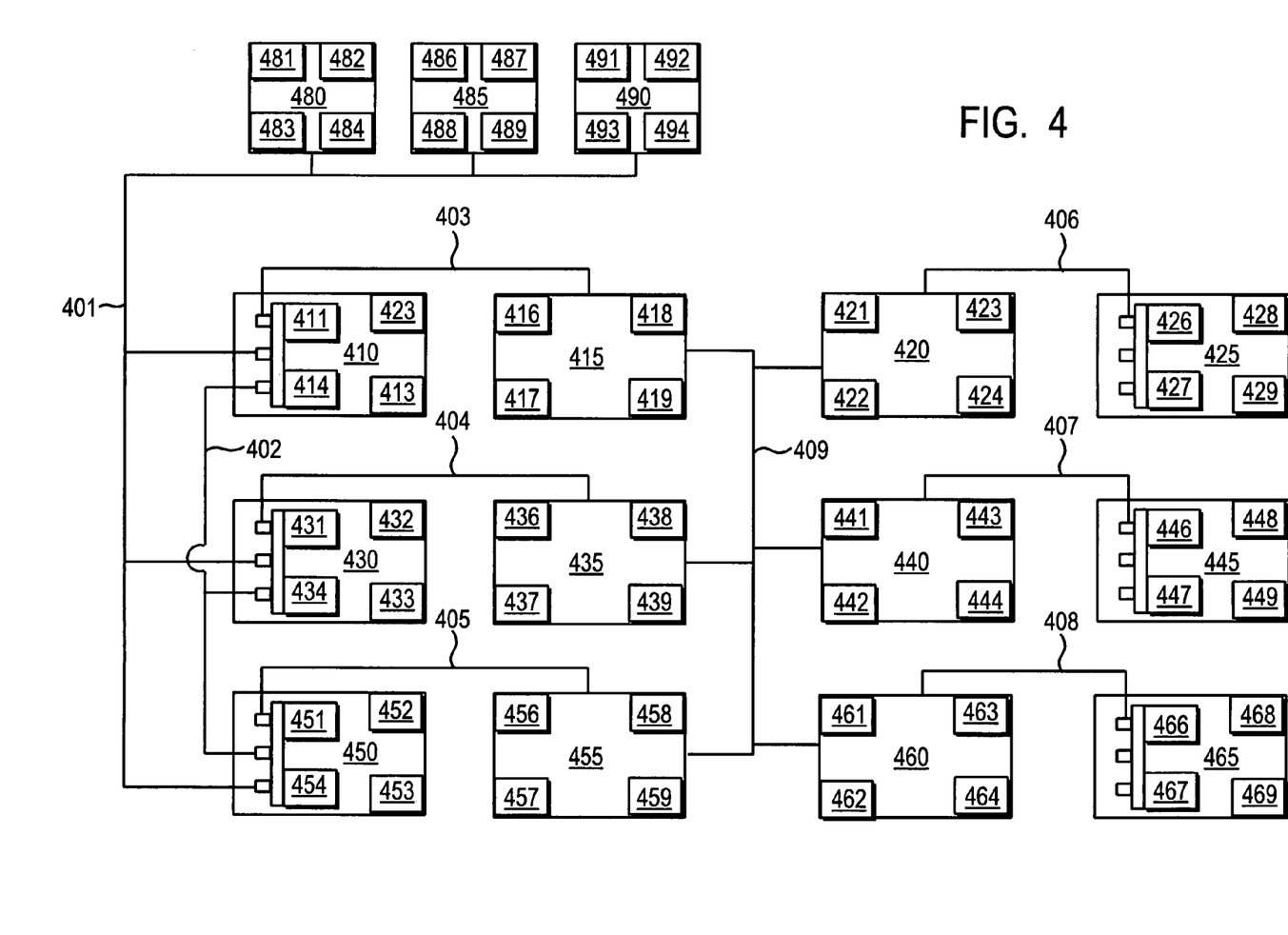
FIG. 4 is a block diagram showing the components of Applicants' peer-to-peer remote copy data storage and retrieval system.

FIG. 4 shows the components of Applicants' data processing system. Referring now to FIG. 4, host computers 480, 485, and 490, are interconnected to, and communicate with, one another via communication link 401. Host computers 480, 485, and 490, also are interconnected to, and communicate with, primary data storage and retrieval systems 410, 430, and 450, via communication link 401. In certain embodiments, communication link 401 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Host computers 480, 485, and 490, each comprise a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.)

Computer 480 includes a processor, i.e. a control node, such as control node 481. Computer 485 includes a processor, i.e. a control node, such as control node 486. Computer 490 includes a processor, i.e. a control node, such as control node 491. In the illustrated embodiment of FIG. 4, control nodes 481, 486, and 491, communicate with one another using communication link 401.

In certain embodiments, host computers 480, 485, and 490, include storage management programs 482, 487, and 492, respectively. The storage management programs 482, 487, and 492, may include the functionality of storage management type programs known in the art that manage the transfer of data to a data storage and retrieval system, such as the IBM DFSMS implemented in the IBM MVS operating system.

Primary data storage and retrieval system 410 provides information from primary information storage medium 412 to secondary data storage and retrieval system 425 for copying to secondary information storage medium 427, via primary backup appliance 415 and secondary backup appliance 420. Information storage and retrieval system 410 further includes a processor, i.e. control node 411. Information storage and retrieval system 425 further includes a processor, i.e. control node 426.

In certain embodiments, information storage medium 412 comprises a DASD. In certain embodiments, information storage medium 412 comprises one or more RAID arrays. In certain embodiments, information storage medium 412 comprises a plurality of portable information storage media, including for example a plurality of magnetic tapes, individually disposed in a portable container, such as for example a tape cartridge.

In certain embodiments, information storage medium 427 comprises a DASD. In certain embodiments, information storage medium 427 comprises one or more RAID arrays. In certain embodiments, information storage medium 427 comprises a plurality of portable information storage media, including for example a plurality of magnetic tapes, individually disposed in a portable container, such as for example a tape cartridge.

In certain embodiments, primary backup appliance 415 is integral with primary data storage and retrieval system 410. In the illustrated embodiment of FIG. 4, primary backup appliance 415 is external to primary data storage and retrieval system 410, and communicates with primary data storage and retrieval system 410 via communication link 403. In certain embodiments, communication link 403 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 420 is integral with secondary data storage and retrieval system 425. In the illustrated embodiment of FIG. 4, secondary backup appliance 420 is external to secondary data storage and retrieval system 425, and communicates with secondary data storage and retrieval system 425 via communication link 406. In certain embodiments, communication link 406 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary data storage and retrieval system 430 provides information from primary information storage medium 432 to secondary data storage and retrieval system 445 for copying to secondary information storage medium 447, via primary backup appliance 435 and secondary backup appliance 440. Information storage and retrieval system 430 further includes control node 431. Information storage and retrieval system 445 further includes control node 446.

In certain embodiments, information storage medium 432 comprises a DASD. In certain embodiments, information storage medium 432 comprises one or more RAID arrays. In certain embodiments, information storage medium 432 comprises a plurality of portable information storage media, including for example a plurality of magnetic tapes, individually disposed in a portable container, such as for example a tape cartridge.

In certain embodiments, information storage medium 447 comprises a DASD. In certain embodiments, information storage medium 447 comprises one or more RAID arrays. In certain embodiments, information storage medium 447 comprises a plurality of portable information storage media, including for example a plurality of magnetic tapes, individually disposed in a portable container, such as for example a tape cartridge.

In certain embodiments, primary backup appliance 435 is integral with primary data storage and retrieval system 430. In the illustrated embodiment of FIG. 4, primary backup appliance 435 is external to primary data storage and retrieval system 430, and communicates with primary data storage and retrieval system 430 via communication link 404. In certain embodiments, communication link 404 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 440 is integral with secondary data storage and retrieval system 445. In the illustrated embodiment of FIG. 4, secondary backup appliance 440 is external to secondary data storage and retrieval system 445, and communicates with secondary data storage and retrieval system 445 via communication link 407. In certain embodiments, communication link 407 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary data storage and retrieval system 450 provides information from primary information storage medium 452 to secondary data storage and retrieval system 465 for copying to secondary information storage medium 467, via primary backup appliance 445 and secondary backup appliance 460. Information storage and retrieval system 450 further includes control node 451. Information storage and retrieval system 465 further includes control node 466.

In certain embodiments, information storage medium 452 comprises a DASD. In certain embodiments, information storage medium 452 comprises one or more RAID arrays. In certain embodiments, information storage medium 452 comprises a plurality of portable information storage media, including for example a plurality of magnetic tapes, individually disposed in a portable container, such as for example a tape cartridge.

In certain embodiments, information storage medium 467 comprises a DASD. In certain embodiments, information storage medium 467 comprises one or more RAID arrays. In certain embodiments, information storage medium 467 comprises a plurality of portable information storage media, including for example a plurality of magnetic tapes, individually disposed in a portable container, such as for example a tape cartridge.

In certain embodiments, primary backup appliance 455 is integral with primary data storage and retrieval system 450. In the illustrated embodiment of FIG. 4, primary backup appliance 455 is external to primary data storage and retrieval system 450, and communicates with primary data storage and retrieval system 450 via communication link 405. In certain embodiments, communication link 405 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, secondary backup appliance 460 is integral with secondary data storage and retrieval system 465. In the illustrated embodiment of FIG. 4, secondary backup appliance 460 is external to secondary data storage and retrieval system 465, and communicates with secondary data storage and retrieval system 465 via communication link 408. In certain embodiments, communication link 408 is selected from the group consisting of a serial interconnection, such as an RS-232 cable or an RS-432cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Primary backup appliances 415, 435, and 455, receive information from primary data storage and retrieval systems 410, 430, and 450, respectively. Periodically, primary backup appliances 415, 435, and 455, form consistent transactions sets. By "consistent transactions set," Applicant mean a set of transactions for which when all of the transactions in the set are applied at the secondary data storage and retrieval system controller, the secondary storage will look identical to the primary storage at the point-in-time that the set was created.

Figure 1:
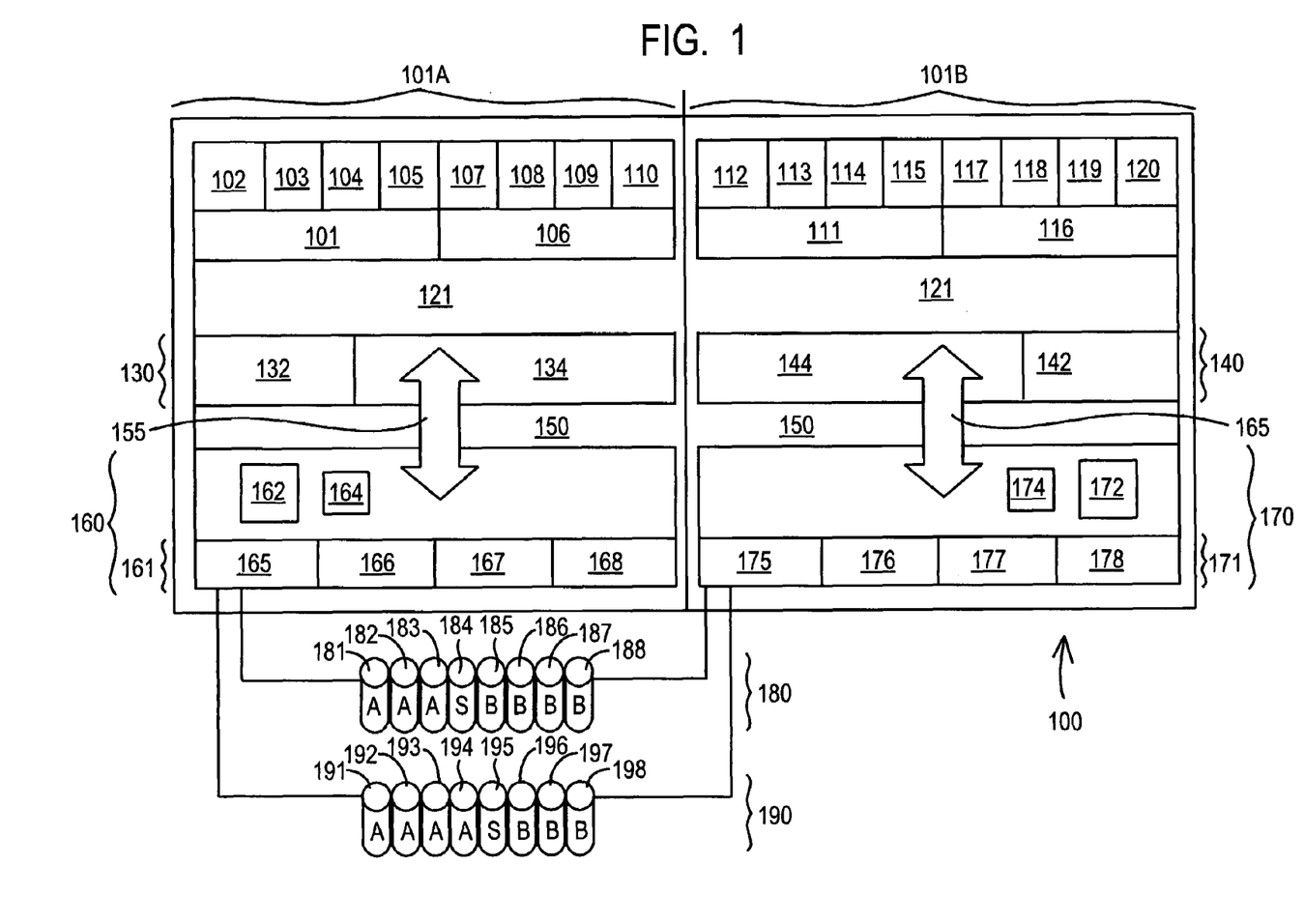
FIG. 1 is a block diagram showing the components of one embodiment of Applicants' data storage and retrieval system.

In certain embodiments, one or more of data storage and retrieval systems 410, 425, 430, 445, 450, and/or 465, comprise data storage and retrieval system 100 (FIG. 1). Referring now to FIG. 1. Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one Fibre Channel port, one FICON port, two ESCON ports, or two SCSI ports. Each host adapter is connected to both clusters through one or more Common Platform Interconnect buses 121 and 150 such that each cluster can handle I/O from any host adapter.

Processor portion 130 includes processor 132 and cache 134. In certain embodiments, processor 132 comprises a 64-bit RISC based symmetric multiprocessor. In certain embodiments, processor 132 includes built-in fault and error-correction functions. Cache 134 is used to store both read and write data to improve performance to the attached host systems. In certain embodiments, cache 134 comprises about 4 gigabytes. In certain embodiments, cache 134 comprises about 8 gigabytes. In certain embodiments, cache 134 comprises about 12 gigabytes. In certain embodiments, cache 144 comprises about 16 gigabytes. In certain embodiments, cache 134 comprises about 32 gigabytes.

Processor portion 140 includes processor 142 and cache 144. In certain embodiments, processor 142 comprises a 64-bit RISC based symmetric multiprocessor. In certain embodiments, processor 142 includes built-in fault and error-correction functions. Cache 144 is used to store both read and write data to improve performance to the attached host systems. In certain embodiments, cache 144 comprises about 4 gigabytes. In certain embodiments, cache 144 comprises about 8 gigabytes. In certain embodiments, cache 144 comprises about 12 gigabytes. In certain embodiments, cache 144 comprises about 16 gigabytes. In certain embodiments, cache 144 comprises about 32 gigabytes.

I/O portion 160 includes non-volatile storage ("NVS") 162 and NVS batteries 164. NVS 162 is used to store a second copy of write data to ensure data integrity should there be a power failure of a cluster failure and the cache copy of that data is lost. NVS 162 stores write data provided to cluster 101B. In certain embodiments, NVS 162 comprises about 1 gigabyte of storage. In certain embodiments, NVS 162 comprises four separate memory cards. In certain embodiments, each pair of NVS cards has a battery-powered charging system that protects data even if power is lost on the entire system for up to 72 hours.

I/O portion 170 includes NVS 172 and NVS batteries 174. NVS 172 stores write data provided to cluster 101A. In certain embodiments, NVS 172 comprises about 1 gigabyte of storage. In certain embodiments, NVS 172 comprises four separate memory cards. In certain embodiments, each pair of NVS cards has a battery-powered charging system that protects data even if power is lost on the entire system for up to 72 hours.

In the event of a failure of cluster 101B, the write data for the failed cluster will reside in the NVS 162 disposed in the surviving cluster 101A. This write data is then destaged at high priority to the RAID ranks. At the same time, the surviving cluster 101A will begin using NVS 162 for its own write data thereby ensuring that two copies of write data are still maintained.

I/O portion 160 further comprises a plurality of device adapters, such as device adapters 165, 166, 167, and 168, and sixteen disk drives organized into two RAID ranks, namely RAID rank "A" and RAID rank "B". In certain embodiments, RAID ranks "A" and "B" utilize a RAID 5 protocol. In certain embodiments, RAID ranks "A" and "B" utilize a RAID 10 protocol.

Figure 2:
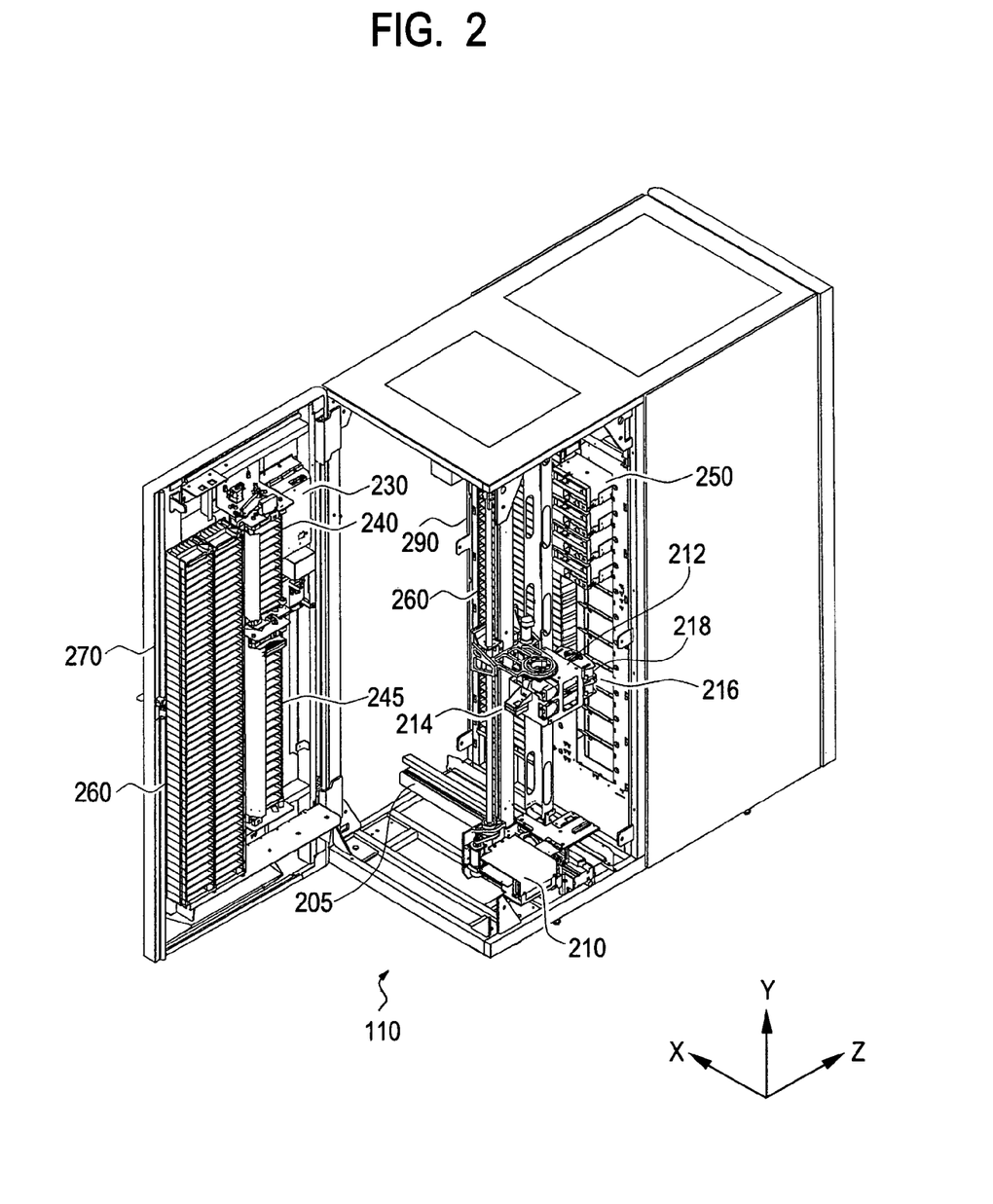
FIG. 2 is a block diagram showing the components of a second embodiment of Applicants' data storage and retrieval system.

In certain embodiments, one or more of data storage and retrieval systems 410, 425, 430, 445, 450, and/or 465, comprise data storage and retrieval system 200 (FIG. 2). FIG. 2 shows one embodiment of system 200.

System 200 is arranged for accessing portable data storage media in response to commands from one or more host systems, such as host computer 390 (FIG. 4). System 200 includes a plurality of storage shelves 260, on front wall 270 and rear wall 290, for storing portable data storage cartridges that contain data storage media. System 200 further includes at least one data storage drive 250 for reading and/or writing data with respect to the data storage media, and at least one accessor 210 for transporting the data storage media between the plurality of storage shelves 260 and the data storage drive(s) 250. System 200 may optionally comprise an operator panel 230 or other user interface, such as a web-based interface, which allows a user to interact with the library. System 200 may optionally comprise an upper import/export station 240 and/or a lower import/export station 245, which allows data storage media to be inserted into the library and/or removed from the library without disrupting library operation.

Accessor 210 comprises lifting servo section 212 which is capable of bidirectional movement along the Z axis. Accessor 210 further comprises at least one gripper assembly 216 for gripping one or more data storage media. In the illustrated embodiment of FIG. 2, accessor 210 further includes a bar code scanner 214 or other reading system, such as a smart card reader or similar system, to "read" identifying information about the data storage media. In the illustrated embodiment of FIG. 2, accessor 210 further includes a second gripper mechanism 218 disposed on lifting servo section 212.

In certain embodiments, system 200 comprises one or more storage frames, each having storage shelves 260 accessible by accessor 210. Accessor 210 moves bidirectionally along the X axis on rail 205. In embodiments of library 100 which comprise multiple frames, the rail 205 in each of those individual frames are aligned such that accessor 210 may travel from one end of the library to the opposite end along a contiguous rail system.

Figure 3:
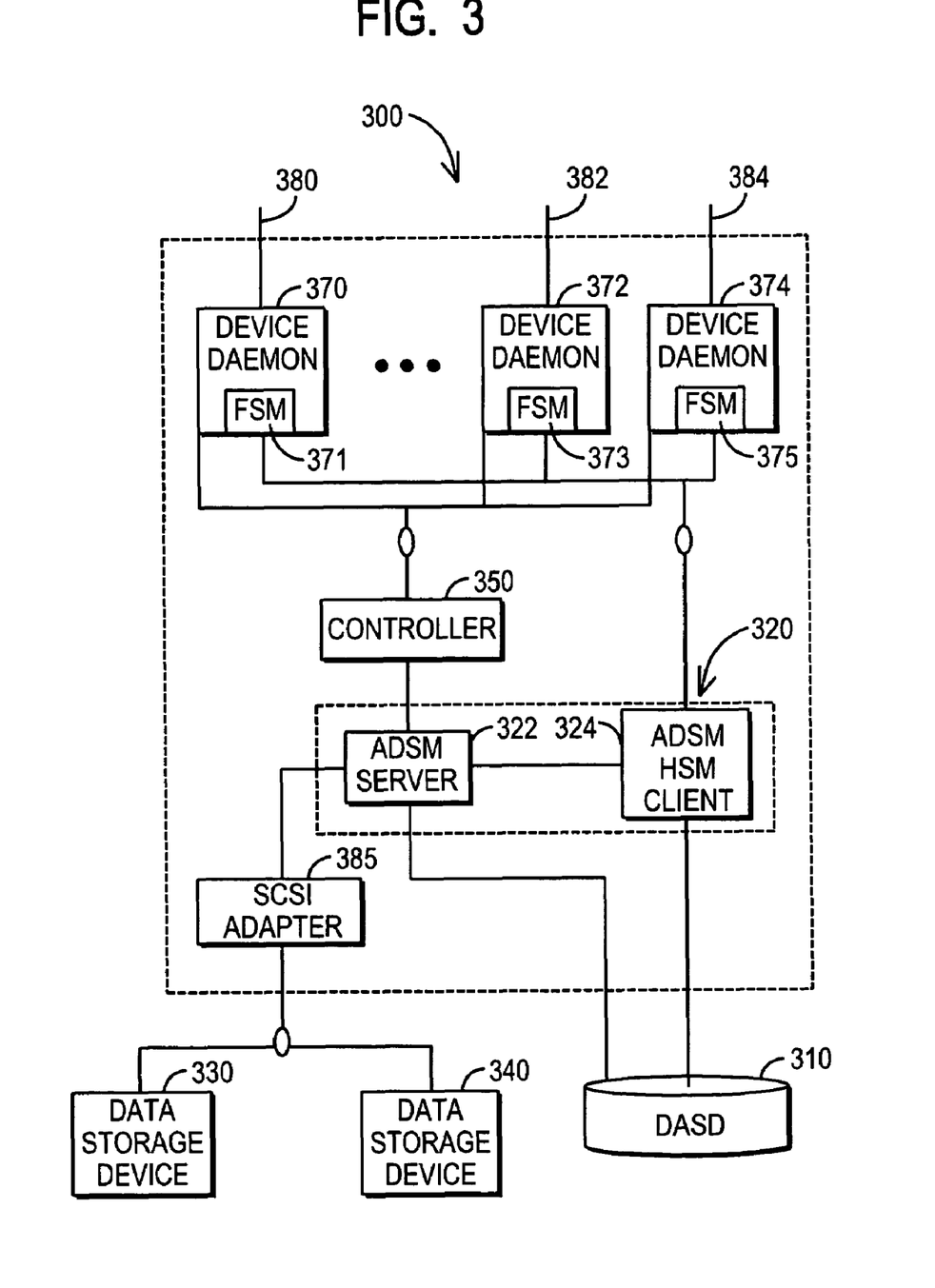
FIG. 3 is a block diagram showing the components of a third embodiment of Applicants' data storage and retrieval system.

In certain embodiments, one or more of data storage and retrieval systems 410, 425, 430, 445, 450, and/or 465, comprise data storage and retrieval system 300 (FIG. 3). Referring now to FIG. 3, virtual tape server 300 ("VTS") 300 communicates with one or hosts and with one or more virtual tape servers via daemons 370, 372, and 374. In the illustrated embodiment of FIG. 3, daemon 370 communicates with a first host via communication link 380. In the illustrated embodiment of FIG. 3, daemon 372 communicates with a second host via communication link 382. Daemon 374 communicates with, for example, a primary backup appliance, such as appliance 415, via communication link 384.

VTS 300 also communicates with direct access storage device (DASD) 310, a plurality of data storage devices 330 and 340. In certain embodiments, data storage devices 330 and 340 are disposed within one or more data storage and retrieval systems. In certain embodiments, DASD 310 is integral with host 110 (FIG. 1). In certain embodiments, DASD 310 is integral with VTS 300. In certain embodiments, DASD 310 is integral with a data storage and retrieval system. In certain embodiments, DASD 310 is external to host 110, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 330 and 340. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 330 and 340 via ADSM server 322 and SCSI adapter 385.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140.

Referring again to FIG. 4, each host computer provides information to one or more primary data storage and retrieval systems. In order to maximally utilize the bandwidth of communication link 401, host computers 480, 485, and 490, must interact to allocate that bandwidth. In certain embodiments of Applicants' method, control nodes 481, 486, and 491, interact to select, on a performance basis, a captain control node. That captain host control node coordinates certain functions, such as forming consistent transaction sets by each of host computers 480, 485, and 490. Pending patent application having Ser. No. 10/339,957, entitled "Method, System, and Article of Manufacture for Creating a Consistent Copy," and assigned to the common assignee hereof, describes a method to form consistent transaction sets, and is hereby incorporated by reference in its entirety.

Referring again to FIG. 4, each primary data storage and retrieval system 410, 430, and 450, receives differing amounts information, from differing host computers, at differing data transfer rates. Each primary data storage and retrieval system 410, 430, and 450, provides differing amounts of information to one or more of primary backup appliances 415, 435, and 455, at differing data transfer rates. In certain embodiments of Applicants' method, control nodes 411, 431, and 451, interact to select, on a performance basis, a captain control node. That captain host control node coordinates certain functions, such as forming consistent transaction sets by each of primary data storage and retrieval systems 410, 430, and 450.

Referring again to FIG. 4, each primary backup appliance receives data from a different primary storage control node and at a different rate than the other primary backup appliances. In certain embodiments of Applicants' method, control nodes 417, 437, and 457, interact to select, on a performance basis, a captain control node. That captain backup appliance control node coordinates certain functions, such as forming consistent transaction sets by each of primary backup appliances 415, 435, and 455.

The primary backup appliances, such as appliances 415, 425, and 435, provide consistent transactions sets to their corresponding secondary backup appliances, such as appliances 420, 430, and 440, respectively, via a common communication link, such as communication link 409. In certain embodiments, communication link 409 is selected from the group consisting of a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Figure 5A:
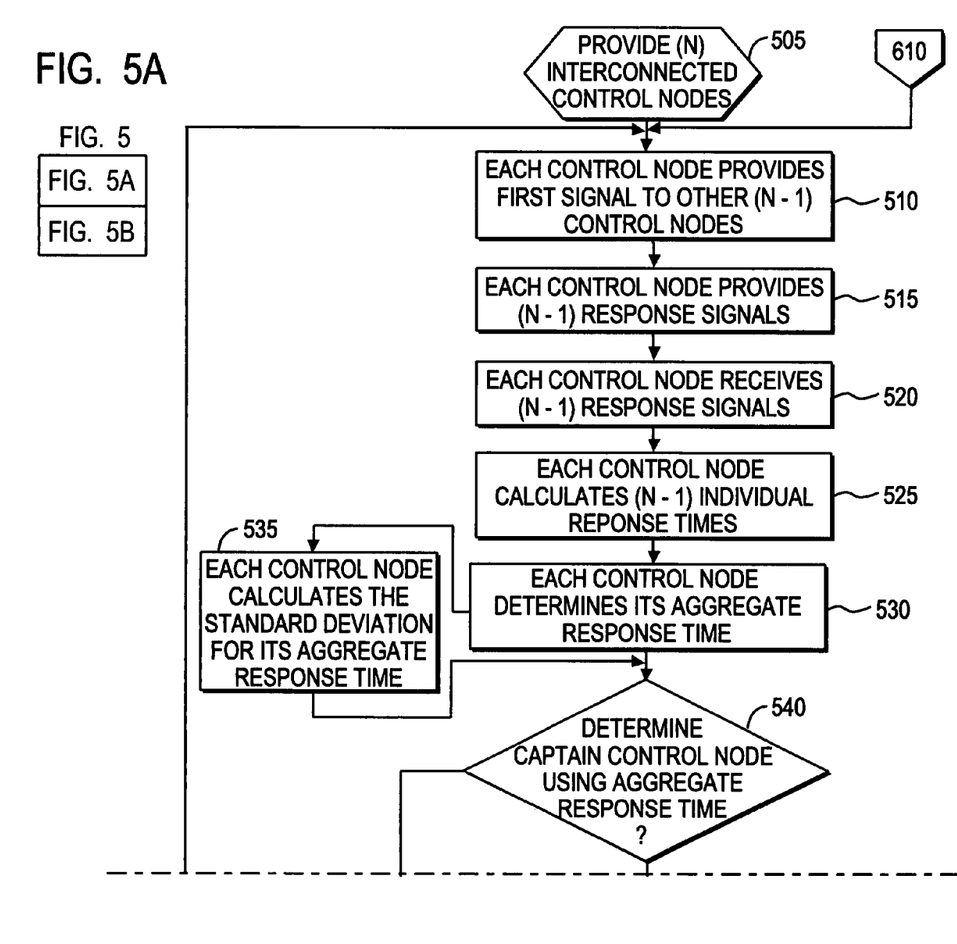
FIG. 5 is a flow chart summarizing certain initial steps in Applicants' method.
Figure 5B:
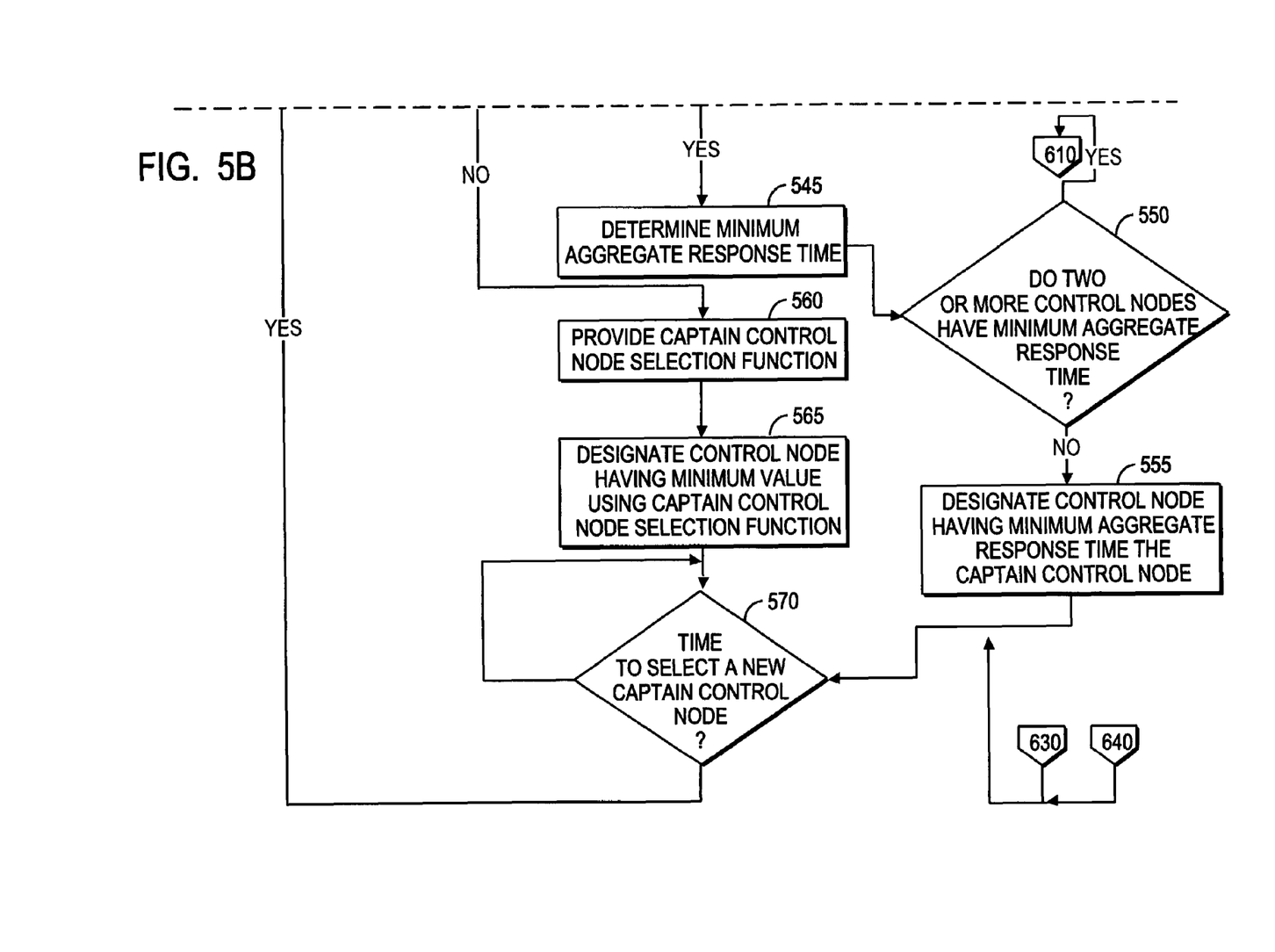

As a general matter, Applicants' invention includes a method for a plurality of interconnected control nodes to select a captain control node based upon actual performance criteria. FIG. 5 summarizes certain steps of Applicants' method. Referring now to FIG. 5, in step 505 the method provides a plurality, i.e. a total of (N) where (N) is greater than or equal to 2, of interconnected control nodes. In certain embodiments, each of the (N) interconnected control nodes is disposed in a different one of (N) host computers. In certain embodiments, each of the (N) interconnected control nodes is disposed in a different one of (N) data storage and retrieval systems. In certain embodiments, each of the (N) interconnected control nodes is disposed in a different one of (N) backup appliances.

In step 510, each control node provides at a first time a first signal to each of the other (N−1) interconnected control nodes. Applicants' method transitions from step 510 to step 515 wherein upon receiving a first control signal, each of the (N) control nodes provides a response signal. Therefore, step 515 includes providing (N−1) response signals by each of the (N) control nodes.

Applicants' method transitions from step 515 to 520 wherein at (N−1) second times each control node receives response signals from the other (N−1) control nodes. Applicants' method transitions from step 520 to step 525 wherein each control node calculates (N−1) individual response times to its heart beat signals, i.e. a response time for each of the other (N−1) control nodes. As those skilled in the art will appreciate, a control node calculates the response time for the (i)th other control node by subtracting the (i)th second time of step 520 from the first time of step 510.

Applicants' method transitions from step 525 to step 530 wherein each control node determines its aggregate response time. The aggregate response time for a first control node comprises the sum of the (N−1) response times for the other control nodes to respond to the first control node's heartbeat signal. In certain embodiments, step 530 further includes reporting, by each control node to each of the other control nodes, its aggregate response time. This reporting may comprise any signaling method known to those of skill in the art. For example, each control node may send a message to each of the other (N−1) control nodes comprising its aggregate response time. In other embodiments, each control node polls the other (N−1) control nodes to obtain aggregate response times from those other control nodes. In certain embodiments, Applicants' method transitions from step 530 to step 540.

In certain embodiments, Applicants' method transitions from step 530 to step 535 wherein each control node calculates a standard deviation for the (N−1) individual response times comprising its aggregate response time. As those skilled in the art will appreciate, a standard deviation indicates bow tightly all the data points of a distribution are clustered around the mean. When the data are tightly bunched together, i.e. the bell-shaped curve is steep, the standard deviation is small. When the data are spread apart and the bell curve is relatively flat, the standard deviation is larger.

In certain embodiments, step 535 further includes reporting, by each control node, its standard deviation to each of the other interconnected control nodes. This reporting may comprise any signaling method known to those of skill in the art. For example, each control node may send a message to each of the other (N−1) control nodes comprising the standard deviation of step 530. In certain embodiments, each control node polls the other (N−1) control nodes in step 535 to obtain standard deviations from those other control nodes.

Applicants' method transitions from step 535 to step 540 wherein the method determines whether to select a captain control node using the (N) aggregate response times as the primary determinant. If Applicants' method elects in step 540 to select a captain control node using the (N) aggregate response times as the primary determinant, then the method transitions from step 540 to step 545 wherein each of the (N) control nodes independently identifies the minimum aggregate response time.

Figure 6:
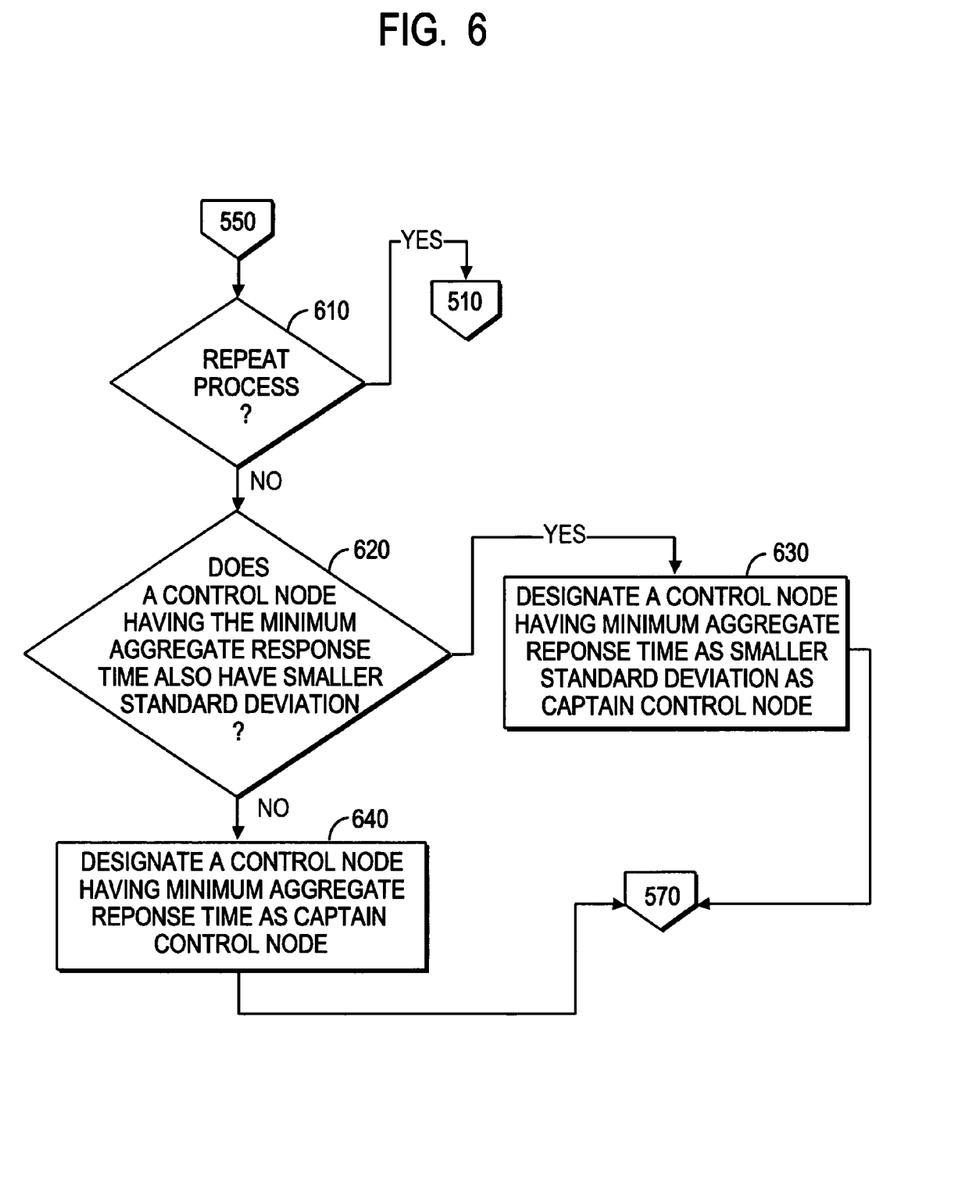
FIG. 6 is a flow chart summarizing certain additional steps in Applicants' method.

Applicants' method transitions from step 545 to step 550 wherein each control node determines if two or more control nodes have the minimum aggregate response time. If Applicants' method determines in step 550 that two or more control nodes have the minimum aggregate response time, then the method transitions from step 550 to step 610 (FIG. 6). If Applicants' method determines in step 550 that two or more control nodes do not have the minimum aggregate response time, then the method transitions from step 550 to step 555 wherein the method designates the control node having the minimum aggregate response time as the captain control node.

Applicants' method transitions from step 555 to step 570 wherein the method determines if it is time to select a new captain control node. If Applicants' method determines in step 570 that it is not time to select a new captain control node, then the method periodically transitions back to step 570. If Applicants' method determines in step 570 that it is time to select a new captain control node, then the method transitions from step 570 to step 510 and continues.

If Applicants' method elects in step 540 not to select a captain control node using the (N) aggregate response times as the primary determinant, then the method transitions from step 540 to step 560 wherein Applicants' method provides a captain control node selection function. In certain embodiments, the captain control node selection function of step 560 is set in firmware, such as firmware 481 (FIG. 4), 486 (FIG. 4), 491 (FIG. 4), disposed in a host computer. In certain embodiments, the captain control node selection function of step 560 is set in firmware, such as firmware 412 (FIG. 4), 432 (FIG. 4), 452 (FIG. 4), disposed in a data storage and retrieval system. In certain embodiments, the captain control node selection function of step 560 is set in firmware, such as firmware 416 (FIG. 4), 436 (FIG. 4), 456 (FIG. 4), disposed in a backup appliance.

Step 560 further includes determining a performance score for each of the interconnected control nodes using the captain control node selection function. In certain embodiments, each control node calculates for each of the (N) control nodes a performance score based upon both the aggregate response time of step 530 and standard deviation of step 535. In certain embodiments, step 560 includes determining a performance score for each control node using equation (1):

$$\text{Performance Score} = a(\text{aggregate response time})^c + b(\text{standard deviation})^d \qquad (1)$$

wherein a, b, c and d are positive constants. A lower performance score comprises better performance, i.e. a smaller aggregate response time and a smaller standard deviation.

Applicants' method transitions from step 560 to step 565 wherein the method designates the control node having the minimum performance score of step 560 as the captain control node. If two or more control nodes each have the minimum performance score, step 565 selects one of these control nodes. In certain embodiments, all control nodes independently perform steps 560 and 565 to designate the control node having the minimum performance score the captain control node. Applicants' method transitions from step 565 to step 570.

If Applicants' method determines in step 550 that two or more control nodes have the minimum aggregate response time, then the method transitions to step 610 (FIG. 6) wherein the method determines whether to repeat the steps of FIG. 5. In certain embodiments, whether to repeat the steps of FIG. 5 if two or more control nodes have the minimum aggregate response time is set in firmware, such as firmware 481 (FIG. 4), 486 (FIG. 4), 491 (FIG. 4), disposed in a host computer. In certain embodiments, whether to repeat the steps of FIG. 5 if two or more control nodes have the minimum aggregate response time is set in firmware, such as firmware 416 (FIG. 4), 436 (FIG. 4), 456 (FIG. 4), disposed in a backup appliance.

If Applicants' method elects to repeat the steps of FIG. 5, then the method transitions from step 610 to step 510 and continues. If Applicants' method elects not to repeat the steps of FIG. 5, then the method transitions from step 610 to step 620 wherein the method determines if a control node having the minimum aggregate response time has a standard deviation less than any of the other control nodes having the minimum aggregate response time. If Applicants' method determines that a control node having the minimum aggregate response time has a standard deviation less than any of the other control nodes having the minimum aggregate response time, then the method transitions from step 620 to step 630 wherein each control node designates the control node having the minimum aggregate response time and the lesser standard deviation as the captain control node. Applicants' method transitions from step 630 to step 570 and continues.

If Applicants' method determines in step 620 that no control node having the minimum aggregate response time has a standard deviation less than any of the other control nodes having the minimum aggregate response time, then the method transitions from step 620 to step 640 wherein the method designates one of the control nodes having the minimum aggregate response time as the captain control node. Applicants' method transitions from step 640 to step 570 and continues.

In certain embodiments, individual steps recited in FIGS. 5 and/or 6 may be combined, eliminated, or reordered.

Applicants' invention further includes an article of manufacture comprising a computer useable medium, such as for example computer useable media 413, 418, 433, 438, 453, 458, 483, 488, and/or 493, having computer readable program code disposed therein to select a captain control node using the steps recited in FIGS. 5 and/or 6.

Applicants' invention further includes a computer program product, such as for example computer program product 414, 419, 434, 439, 454, 459, 484, 489, and/or 494, usable with a programmable computer processor having computer readable program code to select a captain control node using the steps recited in FIGS. 5 and/or 6.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to select a captain control node from a plurality of control nodes, comprising the steps of:

supplying a plurality of host computers, wherein a different one of said plurality of control nodes is disposed in each of said plurality of host computers, and wherein each host computer comprises a storage management program to manage the transfer of data to data storage and retrieval systems;

supplying a plurality of data storage and retrieval systems, wherein each data storage and retrieval system comprises a plurality of host adapters, a plurality of data storage devices, a processor, and a data cache;

supplying a communication link interconnecting each of said plurality of host computers and each of said data storage and retrieval systems;

sending by each of said plurality of control nodes a first signal to each of the other control nodes;

receiving by each of said plurality of control nodes, a response signal from each of the other control nodes;

determining by each of said plurality of control nodes individual response times for each of the other control nodes;

determining an aggregate response time for each of the plurality of interconnected control nodes;

determining whether to select a captain control node using said aggregate response times;

operative if the captain control node is selected using said aggregate response times:

determining a minimum aggregate response time; and determining if two or more control nodes each have said minimum aggregate response time;

if two or more control nodes each have said minimum aggregate response time, repeating said providing, receiving, calculating, and determining steps;

designating a control node having said minimum aggregate response time as the captain control node to coordinate the operations of said plurality of host computers;

calculating by each of said plurality of control nodes a standard deviation for that control node's aggregate response time;

providing said standard deviation by each control node to each of the remaining control nodes.

2. The method of claim 1, further comprising the steps of:

operative if two or more control nodes each have the minimum aggregate response time, determining which of said two or more control nodes has the smallest standard deviation;

designating the control node having the minimum aggregate response time and the smallest standard deviation as the captain control node.

3. The method of claim 2, further comprising the steps of:

operative if the captain control node is not selected using said aggregate response times, providing a captain control node selection function;

determining a performance score for each of the plurality of control nodes using said captain control node selection function;

designating a control node having the minimum performance score as the captain control node.

4. The method of claim 3, wherein said captain control node selection function comprises the equation:

$$\text{Performance Score} = a(\text{aggregate response time})^c + b(\text{standard deviation})^d$$

wherein a, b, c and d are positive constants.

5. An article of manufacture comprising a host computer comprising a control node and a storage management program to manage the transfer of data to data storage and retrieval systems, wherein said host computer is interconnected by a communication link with a plurality of other host computers each comprising a control node, and wherein said host computer is further interconnected by said communication link with a plurality of data storage and retrieval systems, said host computer further comprising a computer useable medium having computer readable program code disposed therein to select a captain control node from said plurality of control nodes, wherein each data storage and retrieval system comprises a plurality of host adapters, a plurality of data storage devices, a processor, and a data cache, the computer readable program code comprising a series of computer readable program steps to effect:

sending a first signal to each of the other control nodes;

receiving a response signal from each of the other control nodes;

determining, individual response times for each of the other control nodes;

determining an aggregate response time for said article of manufacture;

receiving aggregate response times from each of the other control nodes;

determining whether to select a captain control node using said aggregate response times;

operative if the captain control node is selected using said aggregate response times, determining the minimum aggregate response time;

operative if the captain control node is selected using said aggregate response times, designating a control node having said minimum aggregate response time the captain control node to coordinate the operations of said plurality of host computers, determining if two or more control nodes each have said minimum aggregate response time;

if two or more control nodes each have said minimum aggregate response time, repeating said sending, receiving, calculating, and determining steps, calculating a standard deviation for said aggregate response time for said article of manufacture; and receiving standard deviations from each of the other control nodes.

6. The article of manufacture of claim 5, said computer readable program code further comprising a series of computer readable program steps to effect:

operative if two or more control nodes each have said minimum aggregate response time, determining which of said two or more aggregate response time and the smallest standard deviation as the captain control nodes has a smallest standard deviation;

designating the control node having said minimum control node.

7. The article of manufacture of claim 6, said computer readable program code further comprising a series of computer readable program steps to effect:

operative if the captain control node is not selected using said aggregate response times, retrieving a captain control node selection function;

determining a performance score for each of the plurality of control nodes using said captain control node selection function;

designating a control node having the minimum performance score as the captain control node.

8. The article of manufacture of claim 7, wherein said captain control node selection function comprises the equation:

$$\text{Performance Score} = a(\text{aggregate response time})^c + b(\text{standard deviation})^d$$

wherein a, b, c and d are positive constants.

* * * * *